United States Patent
Tuvy et al.

[11] Patent Number: 5,832,078
[45] Date of Patent: Nov. 3, 1998

[54] MULTIPLE JACK AND ENCLOSURE APPARATUS COMBINATION

[75] Inventors: Avraham Tuvy, Oakhurst; Michael P. DiLonardo, Toms River, both of N.J.

[73] Assignee: Antec Corporation, Norcross, Ga.

[21] Appl. No.: 695,311

[22] Filed: Aug. 9, 1996

[51] Int. Cl.$^6$ .................................................... H04M 1/00
[52] U.S. Cl. ............................................ 379/399; 379/397
[58] Field of Search .................................. 379/399, 412, 379/429, 387, 397, 441, 442; 439/277, 345, 660, 133, 144

[56] References Cited

U.S. PATENT DOCUMENTS

| | | | |
|---|---|---|---|
| 4,809,323 | 2/1989 | Collins et al. | 379/399 |
| 4,979,209 | 12/1990 | Collins et al. | 379/399 |
| 5,355,408 | 10/1994 | Lanquist et al. | 379/399 |
| 5,394,466 | 2/1995 | Schneider et al. | 379/399 |

OTHER PUBLICATIONS

Keptel SNI–2400 Network Interface brochure, 1 page, 2 sides, P/N 42–059, Jul. 1987.

Keptel SNI–2900 Network Interface System brochure, 1 page, 2 sides, P/N 42–061, Jul. 1987.

*Primary Examiner*—Jack Chiang

[57] ABSTRACT

Multiple jack and enclosure apparatus combination including a plurality of telephone jacks, each jack connected to one of a plurality of incoming telephone company lines, a telephone plug and a flexible conductor for connecting the telephone plug to a telephone customer line and being of sufficient length to permit the telephone plug to be plugged into any one of the plurality of telephone jacks.

15 Claims, 2 Drawing Sheets

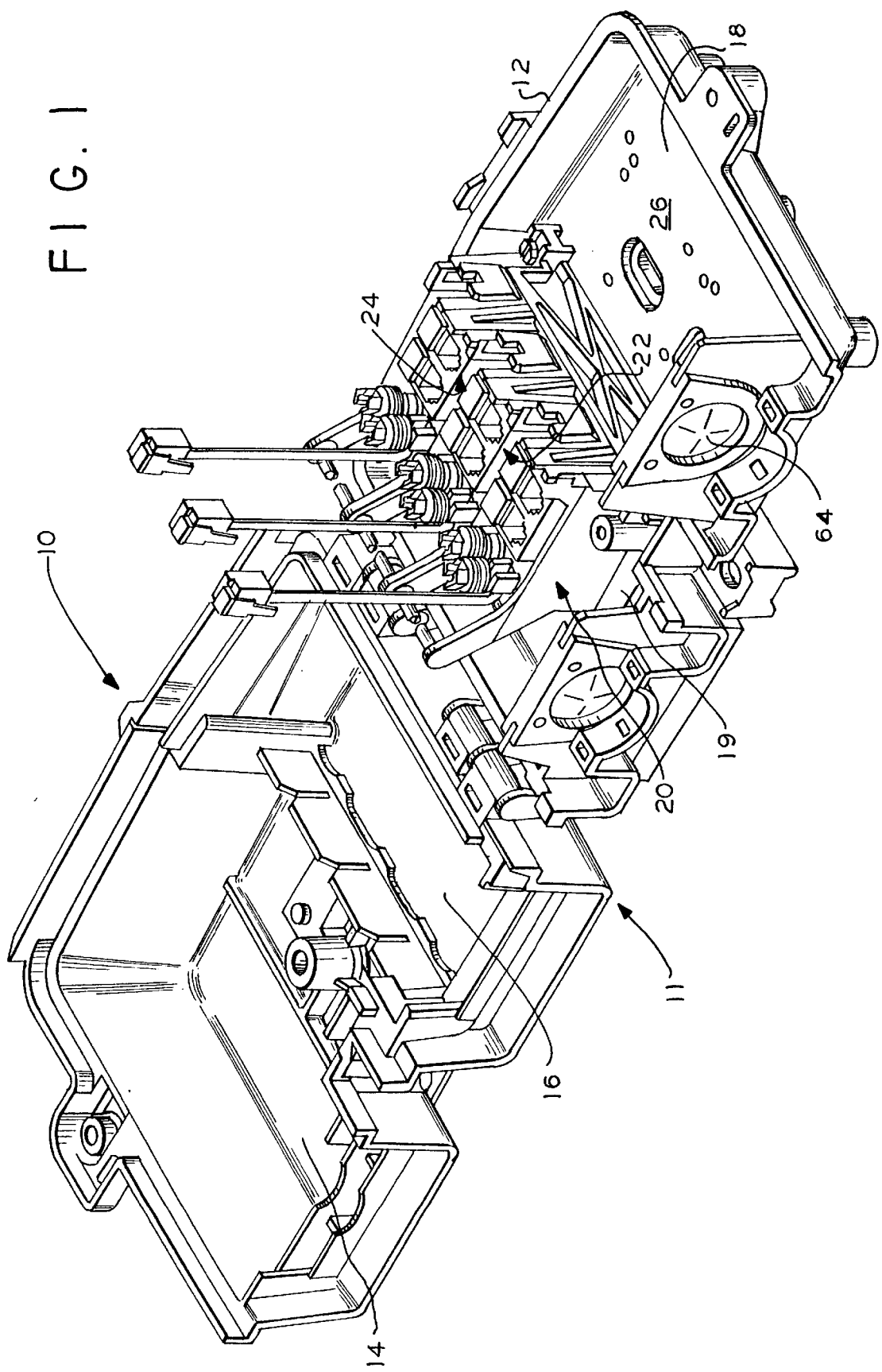

MULTIPLE JACK AND ENCLOSURE APPARATUS COMBINATION

BACKGROUND OF THE INVENTION

This invention relates to apparatus for connecting a telephone customer line to any one of a plurality of incoming telephone company lines and further relates to such apparatus in combination with enclosure apparatus in which such apparatus is mounted.

It will be understood that as used herein and in the appended claims, the term telephone signals is used to mean and include any signal capable of being transmitted over a telephone line, such as a pair of copper wires, including without limitation voice signals and data signals.

With the advent of the availability of telephone service from more than one telephone company, or from more than one provider of telephone signals, there exists a need to connect a telephone customer line to any one of a plurality of incoming telephone lines carrying telephone signals.

SUMMARY OF THE INVENTION

It is the object of the present invention to satisfy the foregoing need in the art.

Apparatus satisfying such need and embodying the present invention may include a plurality of telephone jacks, each jack connected to one of a plurality of incoming telephone company lines, a telephone plug and a flexible conductor for connecting the telephone plug to a telephone customer line and being of sufficient length to permit the telephone plug to be plugged into any one of the plurality of telephone jacks.

DESCRIPTION OF THE DRAWINGS

FIG. 1 is a perspective view showing the multiple jack and enclosure apparatus combination of the present invention;

DESCRIPTION OF THE PREFERRED EMBODIMENT

Figure 3:
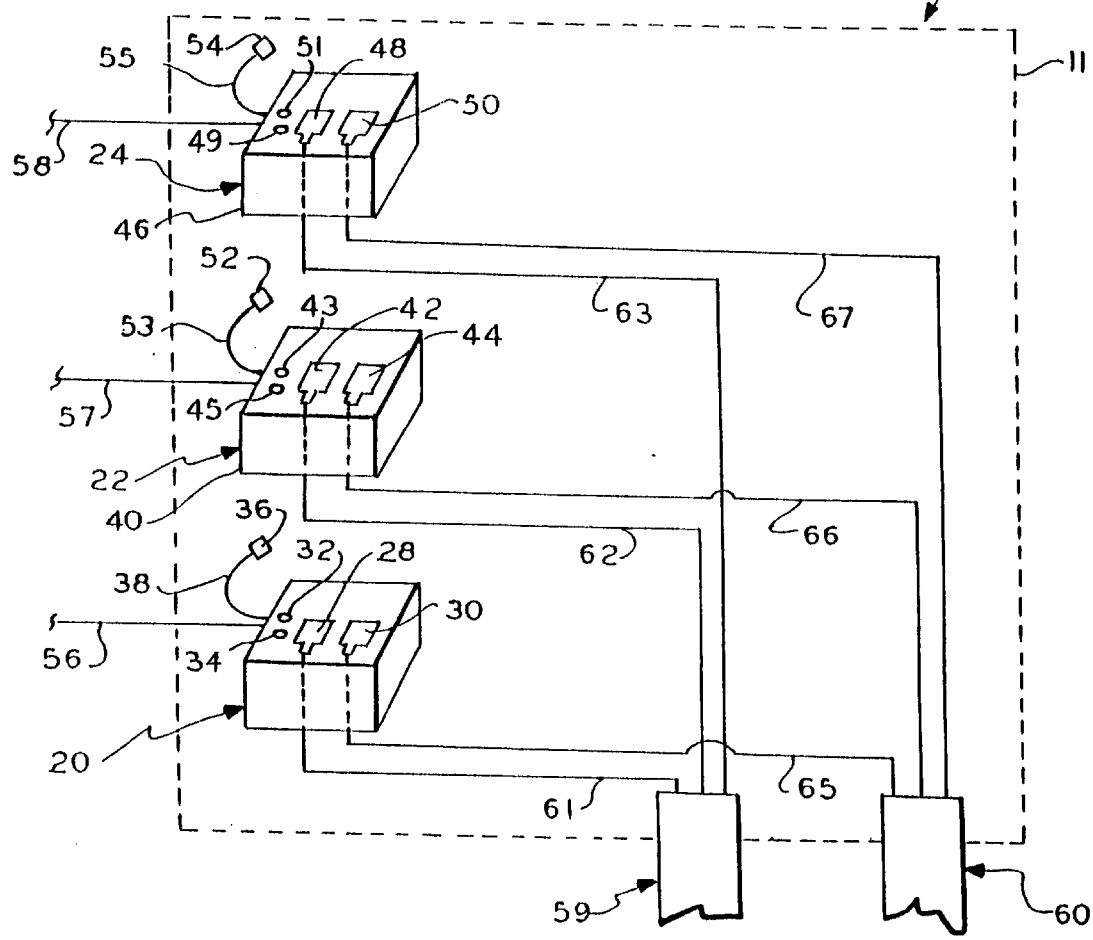
FIG. 3 is a diagrammatical illustration illustrating the manner of connecting incoming telephone lines carrying incoming telephone signals to plurality of jacks provided on the individual subscriber line modules of the present invention.

Referring now to FIG. 1, the combination multiple jack and enclosure apparatus combination of the present invention is indicated by general numerical designation 10. Combination 10 includes enclosure apparatus indicated by general numerical designation 11 which is substantially the same as the enclosure apparatus including base 12, telephone company cover 14 and subscriber cover 16 shown in FIGS. 1–3 of U.S. Pat. No. 4,979,209, entitled INDIVIDUAL SUBSCRIBER LINE MODULE, patented Dec. 18, 1990, Thomas J. Collins et al. inventors, and assigned to the same assignee as the present invention. This patent hereby is incorporated herein by reference as if fully reproduced herein. Accordingly, for convenience of presentation, it will be understood that the components of the enclosure apparatus 11 of the present invention are given the same numerical designations as the corresponding components in the incorporated patent, namely, base 12, telephone company cover 14, and subscriber cover 16. It will be further understood, as set forth in detail in the incorporated patent, that the subscriber cover 16, telephone company cover 14, and base 12 are provided with cooperative fastening means for fastening the telephone company cover 14 fastened over the telephone company compartment 18 and the subscriber cover 16 fastened closed over the subscriber compartment 19.

The combination 10 further includes a plurality, three in the preferred embodiment shown in FIG. 1, of individual subscriber line modules indicated respectively by general numerical designations 20, 22, and 24. It will be further understood that such individual subscriber line modules and the bottom 18 of the base of the base 12 are provided with suitable cooperative mounting means for mounting the individual subscriber line modules to the bottom 18 of the enclosure 11 in the same manner that the individual subscriber line module 220 is mounted to the bottom 20 of the enclosure as illustrated in FIGS. 1 and 5 of U.S. Pat. No. 5,394,466, entitled COMBINATION TELEPHONE NETWORK INTERFACE AND CABLE TELEVISION APPARATUS AND CABLE TELEVISION MODULE, patented Feb. 28, 1995, Pina Schneider et al. inventors, and assigned to the same assignee as the present invention.

Figure 2:
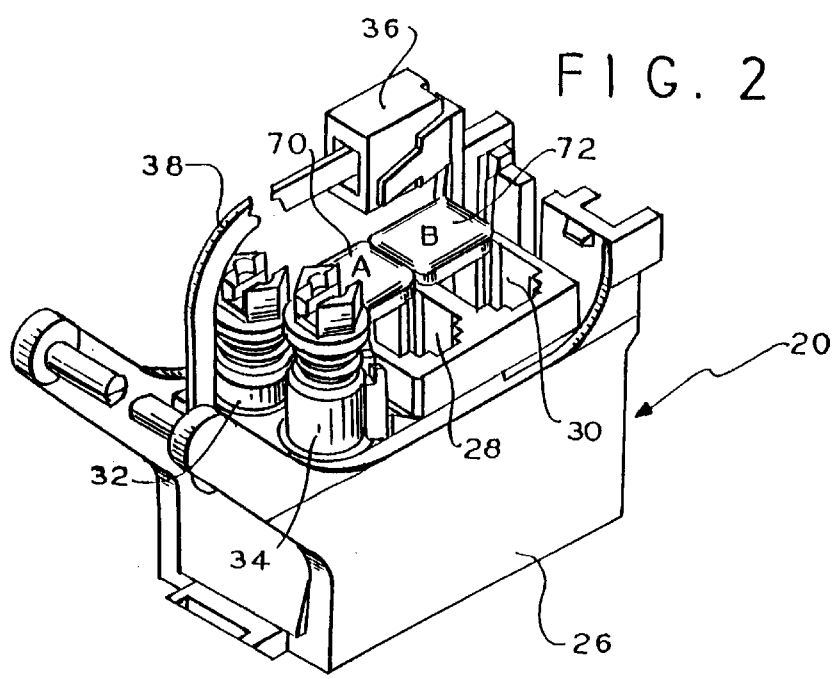
FIG. 2 is a perspective view of an individual subscriber line module embodying the present invention.

Individual subscriber line module 20, representative of all the modules, is shown separately and in greater detail in FIG. 2. Individual subscriber line module 20 includes a base 26 provided with a pair of telephone jacks 28 and 30 of the type known to the art, a pair of subscriber terminals 32 and 34 of the type known to the art for being connected to a telephone subscriber or telephone customer line (not shown), a telephone plug 36 of the type known to the art which is connected to the telephone customer terminals 32 and 34 by the flexible conductor 38; the flexible conductor 38 is connected to the pair of telephone customer terminals 32 and 34 internally of the base 26 and in the manner known to the art and thereby to the telephone customer line. It will be understood that the conductor 38 is of sufficient length to permit the telephone plug 36 to be plugged into either one of the telephone jacks 28 or 30 and of sufficient length to permit the telephone plug 36 to be plugged into any of the other telephone jacks shown in FIG. 1.

Referring now to the diagrammatical illustration of FIG. 3, the individual subscriber line modules 20, 22 and 24 are shown in perspective in block outline, and the enclosure apparatus 11 is shown in dashed outline. Similar to individual subscriber line module 20, individual subscriber line module 22 includes a base 40 provided with a pair of telephone jacks 42 and 44 and a pair of subscriber terminals 43 and 45 to which a telephone plug 52 is connected by a flexible conductor 53, and individual subscriber line module 24 includes a base 46 provided with a pair of telephone jacks 48 and 50 and a pair of telephone terminals 51 and 52 to which a telephone plug 54 is connected by a flexible conductor 55. Connected to the subscriber terminals 32 and 34 of individual subscriber line module 20 is a telephone subscriber or telephone customer line 56, connected to the subscriber terminals 43 and 45 of individual subscriber line module 22 is a telephone subscriber or telephone customer line 57, and connected to the telephone terminals 51 and 49 of the individual subscriber line module 24 is a telephone subscriber or telephone customer line 58. As with flexible conductor 38 of individual subscriber line module 20, the flexible conductor 53 of individual subscriber line module 22 is of sufficient length to permit the telephone plug 52 to be plugged into either telephone jack 42 or 44 of individual subscriber line module 22 and flexible conductor 55 of individual subscriber line module 24 is of sufficient length to permit the telephone plug 54 to be plugged into either telephone jack 48 or 50.

As is further shown in FIG. 3, a pair of incoming telephone cables 59 and 60 enter the enclosure apparatus 11 such as being inserted through the grommet 64 shown in FIG. 1. Incoming telephone company cable 59 includes incoming telephone company lines 61, 62 and 63 connected respectively to the telephone jacks 28, 42 and 48, in the manner known to the art, of the respective individual subscriber line modules 20, 22 and 24. Incoming telephone company cable 60 includes incoming telephone company lines 65, 66 and 67 connected respectively, in the manner known to the art, to telephone jacks 30, 44 and 50 of respective individual subscriber line modules 20, 22 and 24.

First, FIG. 3, it will be assumed that the incoming telephone company cables 59 and 60 and their respective incoming telephone company lines are from a single telephone company, or a single provider of telephone signals, whereby, for example, and with regard to individual subscriber line module 20 as being illustrative of the other individual subscriber line modules, the incoming telephone company line 61 may be carrying voice incoming telephone signals and the incoming telephone company line 65 may be carrying data telephone signals. The telephone plug 36, due to the flexibility and length of the conductor 38, may be plugged into the telephone jack 28 to connect the incoming voice telephone signals to a telephone (not shown) connected to the telephone customer line 56, or the plug 36 may be plugged into jack 30 to connect the incoming data telephone signals carried over the incoming telephone company line 65 to a personal computer (not shown) connected to the telephone customer line 56; alternatively, the incoming telephone lines 61 and 65 could both be carrying voice telephone signals or both carrying data telephone signals and due to the length of the flexible conductor 38 the plug 36 of the individual subscriber line 20 may be plugged into either telephone jack 28 or telephone jack 30 to connect the telephone customer line 56 to either incoming telephone line 61 or 65 to receive the telephone signals desired. It will be further understood that any of the other incoming telephone lines may be carrying incoming telephone signals, either voice or data telephone signals, and that the flexible conductor 38 is of sufficient length to permit the plug 36 to be plugged into any of the other jacks 42, 44, 48 and 50.

Second, FIG. 3, it will be presumed that the incoming telephone company cable 59 is from a first telephone company, or a first provider of telephone signals, and that the incoming telephone cable 60 is from a second telephone company or a second provider of telephone signals. In such a situation, and referring again to individual subscriber line module 20 as being illustrative of the other individual subscriber line modules, it will be understood that the telephone plug 36 due to the flexibility and length of the conductor 38 may be plugged into telephone jack 28 to receive either voice or data incoming telephone signals carried by the incoming telephone line 61 from the first telephone company or first provider of telephone signals or, alternatively, the telephone plug 36 due to the length and flexibility of conductor 38 may be plugged into telephone jack 30 to connect incoming voice or data telephone signals carried by the incoming telephone line 65 from the second telephone company, or second provider of telephone signals, to a telephone (not shown) or a personal computer (not shown) connected to the telephone customer line 56. Since, as noted above, the flexible conductor 38 is of sufficient length to permit the plug 36 to be plugged into any of the other jacks in the other two subscriber line modules of the preferred embodiment shown in FIG. 3, it will be understood that the telephone customer line 56 may be connected to any of the other incoming telephone lines from either of the two telephone companies, or other two telephone signal providers, so as to permit the telephone customer line 56 to receive telephone signals, data or voice for example, as may be transmitted to any of the jacks in the other two subscriber line modules 22 and 24.

Referring further to FIGS. 1 and 3, it will be understood that in the preferred embodiment of the present invention illustrated which includes six jacks in total, that each of the six jacks may be connected to an incoming telephone line from six different telephone companies, or six different providers of telephone signals, whereby each telephone plug, due to the flexibility and length sufficiency of the flexible conductor to which it is connected, may be plugged into any one of the six jacks to receive incoming telephone signals provided by six different telephone companies or six different providers of telephone signals.

Referring again to FIG. 2 and to illustrative individual subscriber line module 20, the individual subscriber line modules may be provided with a pair of indicia bearing tabs or inserts 70 and 72 which may be press fitted into suitable indentations (not shown) provided on the top of the base 26. Upon the telephone jacks 28 and 30 being connected to incoming telephone company lines from different telephone companies, or different providers of telephone signals, the tab or insert 70 may be provided with indicia such as A to indicate that the incoming telephone line connected to the telephone jack 28 is from telephone company or telephone signal provider A and the insert or tab 72 may be provided with indicia such as B to indicate that the telephone jack 30 is connected to incoming telephone company or telephone signal provider B.

It will be understood that many variations and modifications may be made in the present invention without departing from the spirit and the scope thereof.

What is claimed is:

1. An apparatus for connecting a plurality of telephone customer lines to a plurality of incoming telephone company lines, comprising:

an apparatus base into which telephone customer lines and incoming telephone company lines are introduced; and a plurality of subscriber line modules, each said module being removably connected to said apparatus base independently of each other said module, wherein each said module connects a single telephone customer line to any one of a plurality of incoming telephone company lines, and wherein each said module comprises:

a plurality of jacks, wherein each said jack is connected to a different telephone company line;

a pair of subscriber terminals, wherein said subscriber terminals are connected to a single customer line; and a plug connected to said subscriber terminals by a flexible conductor;

wherein said flexible conductor is of sufficient length to permit the plug to be mated with any of said jacks on said module;

wherein by mating said plug to any of said plurality of jacks, said single customer line can be connected to different respective telephone company lines.

2. The apparatus of claim 1 wherein said flexible conductor is of sufficient length to permit the plug to be mated with any of the jacks on any of the other line modules connected to said apparatus.

3. The apparatus of claim 1 wherein there are two jacks on each said module.

4. The apparatus of claim 1 wherein said jacks are located near a first end of said module, and wherein said flexible conductor extends from near said second end of said module, and wherein said subscriber terminals are located on said module between said jacks and said second end of said module.

5. The apparatus of claim 1 wherein an insert, bearing indicia identifying the incoming telephone company line that is associated with each respective jack, is provided on each said module in close proximity to each respective jack.

6. The apparatus of claim 1 wherein each said module includes more jacks than plugs.

7. The apparatus of claim 6 wherein no more than one pair of subscriber terminals are located on each said module.

8. The apparatus of claim 6 wherein no more than one plug is located on each said module.

9. A subscriber line module for connecting a single telephone customer line to any one of a plurality of incoming telephone company lines, said module being removably connected to an apparatus into which telephone customer lines and incoming telephone company lines are introduced, the apparatus being capable of housing a plurality of modules, comprising:
   a module base, said module base being removably connected to said apparatus independently of any other module base;
   a plurality of jacks on said module base, wherein each said jack is connected to a different telephone company line;
   a single pair of subscriber terminals on said module base, wherein said subscriber terminals are connected to said single customer line; and
   a single plug connected to said subscriber terminals by a flexible conductor, wherein said flexible conductor is of sufficient length to permit the plug to be mated with any of the jacks on said module base;
   wherein by mating said plug with either of said jacks on said module base, the single customer line can be connected to different respective telephone company lines.

10. The subscriber line module of claim 9 wherein said module includes more jacks than plugs.

11. The subscriber line module of claim 10 wherein no more than one pair of subscriber terminals are located on said module base.

12. The subscriber line module of claim 10 wherein no more than one plug is located on said module base.

13. The subscriber line module of claim 10 wherein there are two jacks on said module base.

14. The subscriber line module of claim 9 wherein said jacks are located near a first end of said module base, and wherein said flexible conductor extends from near said second end of said module base, and wherein said subscriber terminals are located on said module base between said jacks and said second end of said module base.

15. The subscriber line module of claim 9 wherein an insert, bearing indicia identifying the incoming telephone company line that is associated with each respective jack, is provided on said module base in close proximity to each respective jack.

* * * * *